(12) United States Patent
Liu et al.

(10) Patent No.: US 11,185,817 B2
(45) Date of Patent: Nov. 30, 2021

(54) AMMONIA-BASED MULTI-ZONE DOUBLE-LOOP PROCESS FOR ULTRALOW EMISSION OF MULTI-POLLUTANT

(71) Applicant: Jiangsu Cohen Environmental Protection Co. Ltd., Yancheng (CN)

(72) Inventors: Huaiping Liu, Yancheng (CN); Zhenghua Song, Yancheng (CN); Chengquan Li, Yancheng (CN)

(73) Assignee: JIANGSU COHEN ENVIRONMENTAL PROTECTION CO. LTD., Yancheng (CN)

( * ) Notice: Subject to any disclaimer, the term of this patent is extended or adjusted under 35 U.S.C. 154(b) by 337 days.

(21) Appl. No.: 16/406,031

(22) Filed: May 8, 2019

(65) Prior Publication Data
US 2020/0353407 A1    Nov. 12, 2020

(51) Int. Cl.
| | |
|---|---|
| *B01D 53/14* | (2006.01) |
| *B01D 53/50* | (2006.01) |
| *B01J 19/08* | (2006.01) |
| *B01J 19/18* | (2006.01) |
| *B01J 8/04* | (2006.01) |
| *B01J 20/02* | (2006.01) |

(52) U.S. Cl.
CPC ....... *B01D 53/504* (2013.01); *B01D 53/1481* (2013.01); *B01J 8/0449* (2013.01); *B01J 19/087* (2013.01); *B01J 19/1875* (2013.01); *B01D 2252/102* (2013.01); *B01J 20/0274* (2013.01); *B01J 2220/4806* (2013.01)

(58) Field of Classification Search
CPC combination set(s) only.
See application file for complete search history.

(56) References Cited

FOREIGN PATENT DOCUMENTS

CN      105727699 A   *  7/2016

OTHER PUBLICATIONS

Mashine Translation of CN-105727699-A, Year: 2021.*
Bing text search—see search notes, YEAR: 2021.*

\* cited by examiner

*Primary Examiner* — Cabrena Holecek
(74) *Attorney, Agent, or Firm* — Bayramoglu Law Offices LLC

(57) ABSTRACT

An ammonia-based multi-zone double-loop process for ultra-low emission of multi-pollutant. From an absorption tower inlet, the flue gas successively passes through cooling concentration crystallization, sulfur oxide absorption, water washing and purifying and dust and mist removing zones, which are separated by gas permeable liquid collecting plates, forming clean flue gas and discharged from an outlet. The cooling concentration crystallization zone, the sulfur oxide absorption zone, and the water washing and purifying zone are respectively provided with a plurality of sprayers, and respectively use a concentration liquid, an absorption liquid, and a water washing liquid as spraying liquids. The absorption, concentration and water washing liquids, after converging respectively, into absorption, concentration crystallization and water washing circulation tanks, the absorption, concentration and water washing liquids, respectively, are sprayed in a circulating manner through absorption, concentration and water washing pumps.

9 Claims, 1 Drawing Sheet

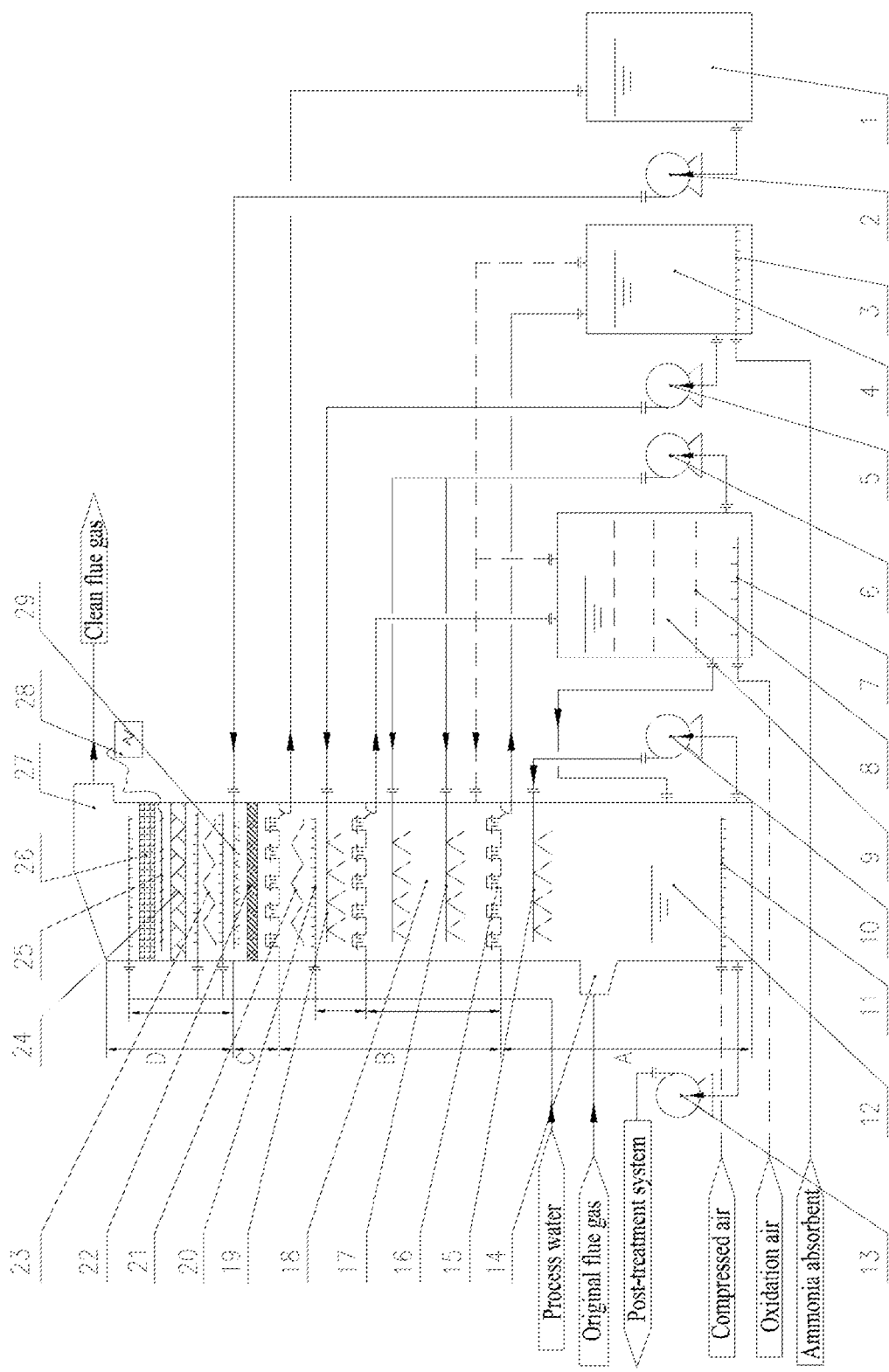

AMMONIA-BASED MULTI-ZONE DOUBLE-LOOP PROCESS FOR ULTRALOW EMISSION OF MULTI-POLLUTANT

TECHNICAL FIELD

The present invention relates to a process, in particular to an ammonia-based multi-zone double-loop process for ultralow emission of multi-pollutant.

BACKGROUND

In recent years, the increasingly serious air pollution has caused considerable social concern. The Chinese government has introduced several relevant environmental protection policies on atmosphere governing and set stricter emission standards. China is a country of high fossil fuel demand, and the coal consumption accounts for up to 70% among the energy resources. The traditional fossil fuels would release lots of pollutant such as dust particles, sulfur dioxide etc. during combustion, which will lead to serious air pollution and pose a risk on human health.

At present, in China, the mature calcium-based (limestone) method is mainly used in the boiler flue gas treatment, and the absorbent of the calcium-based method is limestone. An extensive mining of limestone has leaded to water and soil erosion and damaged the ecological environment. As a result, besides aggravating the greenhouse effect due to the generation of $CO_2$, a large amount of high salinity wastewater is produced. In recent years, the ammonia-based flue gas desulfurization method for boiler has a growing share in the flue gas desulfurization market due to its less cost and occupation of land and the use of the waste ammonia water to absorb sulfur dioxide which has a by-product (ammonium sulfate) is of great economic value. However, the conventional ammonia-based desulfurization process still has the problems of insufficient oxidation, ammonia escape, and large aerosols.

SUMMARY

In order to overcome the drawbacks of the prior art, the objective of the present invention is to provide an ammonia-based multi-zone double-loop process for ultralow emission of multi-pollutant and a device thereof.

In order to achieve the above objectives, the present invention adopts the following technical solutions. An ammonia-based multi-zone double-loop process for ultralow emission of multi-pollutant includes: successively passing a flue gas through a cooling concentration crystallization zone, a sulfur oxide absorption zone, a water washing and purifying zone, and a dust and mist removing zone, which are separated by gas permeable liquid collecting plates, to form a clean flue gas after the flue gas enters from an inlet of an absorption tower, and discharging the clean flue gas from an outlet. The cooling concentration crystallization zone, the sulfur oxide absorption zone, and the water washing and purifying zone are respectively provided with a plurality of sprayers, and spraying liquids of the cooling concentration crystallization zone, the sulfur oxide absorption zone, and the water washing and purifying zone are a concentration liquid, an absorption liquid, and a water washing liquid, respectively. After converging into an absorption tank, the absorption liquid is sprayed in a circulating manner through an absorption pump. After converging into a concentration crystallization tank at a bottom of the absorption tower, the concentration liquid is sprayed in a circulating manner through a concentration pump. After converging into a water washing circulation tank, the water washing liquid is sprayed in a circulating manner through a water washing pump.

The absorption liquid includes an ammonium sulfite solution and an ammonium sulfate solution. The ammonium sulfite solution and the ammonium sulfate solution are sprayed in an ammonium sulfite/ammonium hydrogen sulfite absorption section and an ammonium sulfate absorption section, respectively. After converging into an oxidation tank, the ammonium sulfate solution is sprayed in a circulating manner through an ammonium sulfate pump.

After converging into an ammonia adding tank, a part of the ammonium sulfite solution is sprayed in a circulating manner through an ammonium sulfite pump, and the other part of the ammonium sulfite solution is discharged into the oxidation tank.

Further, a combinational gas distributor is provided in the oxidation tank. The combinational gas distributor includes a porous tubular air distributor and a multilayer bubbling porous plate. A distance between the porous tubular air distributor and a bottom of the oxidation tank is 600-1500 mm. The multilayer bubbling porous plate is provided above the porous tubular air distributor. Each hole of the bubbling porous plate has a diameter of 5-30 mm.

Further, an oxidation air distributing tube is provided on the bottom of the oxidation tank. An overflow port connected to the cooling concentration crystallization zone is provided on a wall of the oxidation tank. An air outlet connected to the absorption tower is provided on tops of the oxidation tank and the ammonia adding tank.

The dust and mist removing zone is provided with a composite mist eliminator. The composite mist eliminator includes a ridged or plate primary mist eliminator in a lower layer, a mesh mist eliminator in a middle layer, and a wire-mesh electric mist eliminator in an upper layer to remove various pollutants such as droplets, tiny particles, and aerosols etc. carried by the flue gas in a step-by-step manner.

Further, the wire-mesh electric mist eliminator includes a high-voltage power supply, a cathode wire and an anode plate. The anode plate is composed of a support grid and a multilayer mesh. The support grid is made of a corrosion-resistant alloy. The mesh is made of corrosion-resistant metal materials or non-metal materials. A space between the cathode wire and the anode plate is 100-250 mm. The high-voltage power supply is any one of a utility frequency power supply, a high frequency power supply, a pulse power supply, a plasma power supply, a direct current power supply, and a variable frequency power supply.

Further, an upper portion of the anode plate of the wire-mesh electric mist eliminator is provided with a plurality of porous tubular flushers with nozzles facing downwards. A lower portion of the mesh mist eliminator is provided with a plurality of porous tubular flushers with nozzles facing upwards. The flushing liquid is process water.

The concentration crystallization tank is provided with a tube-mesh air agitation device with a plurality of nozzles. The tube-mesh air agitation device intercommunicates with external compressed air to prevent a deposition of ammonium sulfate crystal particles in a slurry pool. The ammonium sulfate slurry concentrated to generate crystals enters a post-treatment system.

A top of the sulfur oxide absorption zone is provided with a plurality of absorption liquid mist eliminators. A bottom of each absorption liquid mist eliminator is provided with a porous tubular sprayer with a nozzle facing upwards. The spraying liquid is process water.

A plurality of porous tubular sprayers are provided in the water washing and purifying zone to form a plurality of water washing layers. A filler adsorption layer is provided on a bottom of water washing and purifying zone.

The present invention has the following advantages. According to the ammonia-based multi-zone double-loop process for ultralow emission of multi-pollutant in the present invention, based on the principle that the ammonium sulfite absorbs sulfur dioxide to generate ammonium hydrogen sulfite, then ammonia is added to generate an absorbent ammonium sulfite, and the ammonium sulfite is oxidized to form ammonium sulfate with stable property, the tower body is designed with multiple functional zones and the multiple functional zones are separated by multiple tower plates, i.e., gas permeable liquid collecting trays. The absorption tower is divided into a cooling concentration crystallization zone, a sulfur oxide absorption zone, a water washing and purifying zone, and a dust and mist removing zone. The sulfur oxide absorption zone forms two independent circulation absorption loops, i.e., an ammonium sulfite absorption loop and an ammonium sulfate absorption loop, by respectively connecting the gas permeable liquid collecting trays, pumps, and tubes to the external tanks, thereby forming a double-loop process in the absorption zone.

The present invention has a short technological process, stable operation of devices, and high oxidation efficiency, which ensures that the oxidation rate of ammonium sulfite is up to over 98%. Thus, the liquid level of the oxidation tank and the pressure head of the air blower can be effectively reduced, and the investment cost and operating cost can be lowered. The mist and dust removing ratio by washing in the sulfur oxide absorption zone is about 85-90%, which can achieve the ultra-low emissions. The removal ratio of mist droplet from the clean flue gas in the outlet is up to 99%, while it can be ensured that the mist droplet content at the outlet is less than or equal to 20 mg/Nm$^3$.

By using the device, the content of $SO_2$ in the flue gas at the outlet is less than 35 mg/Nm$^3$, and the content of the particulate matter is less than 5 mg/Nm$^3$. The design is scientific. The arrangement is compact. The desulfurization and dust removing efficiency is high. The generation of aerosol and the trailing and falling phenomenon of the flue gas are completely avoided. The ammonia escape is reduced. Further, the synergistic removal of tiny particles and the ultra-low emission are achieved through the wire-mesh electric dust remover, so the present invention has a good practicability and wide applicability.

BRIEF DESCRIPTION OF THE DRAWINGS

FIGURE is a structural schematic diagram of an ammonia-based multi-zone double-loop process for ultralow emission of multi-pollutant according to the present invention.

The reference designators in the drawing are described as follows:
1. water washing circulation tank,
2. water washing pump,
3. ammonia distributor,
4. ammonia adding tank,
5. ammonium sulfite pump,
6. ammonium sulfate pump,
7. tube-mesh oxidation air distributor,
8. bubbling porous plate,
9. oxidation tank,
10. concentration pump,
11. tube-mesh air agitation device,
12. concentration crystallization tank,
13. discharge pump,
14. flue gas inlet,
15. sprayer,
16. gas permeable liquid collecting tray,
17. ammonium sulfite sprayer,
18. absorption tower,
19. ammonium sulfate sprayer,
20. porous tubular flusher,
21. absorption liquid mist eliminator,
22. filler adsorption layer,
23. primary mist eliminator,
24. mesh mist eliminator,
25. cathode wire,
26. anode plate,
27. outlet,
28. high voltage power supply,
29. water washing sprayer,
A. cooling concentration crystallization zone,
B. sulfur oxide absorption zone,
C. water washing and purifying zone,
D. dust and mist removing zone.

DETAILED DESCRIPTION OF THE EMBODIMENTS

The present invention will be described in detail hereinafter with reference to the drawings and embodiments.

The reactions involved in the ammonia-based multi-zone double-loop process for ultralow emission of multi-pollutant of the present invention mainly include:

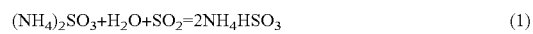
$$(NH_4)_2SO_3+H_2O+SO_2=2NH_4HSO_3 \tag{1}$$

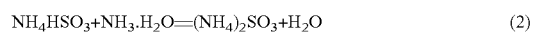
$$NH_4HSO_3+NH_3 \cdot H_2O=(NH_4)_2SO_3+H_2O \tag{2}$$

where, ammonium sulfite absorbs sulfur dioxide to generate ammonium hydrogen sulfite, and ammonium hydrogen sulfite is added with ammonia to generate absorbent, i.e., ammonium sulfite.

The product of the ammonia-based desulfurization is ammonium sulfate which is a stable ammonium salt without the ability to absorb sulfur dioxide. In order to ensure an efficient oxidation rate of ammonium sulfite and an efficient absorption rate of sulfur dioxide, the oxidation process and the absorption process are separated by additionally providing the oxidation tank 8 and the ammonia adding tank 3.

The core part of the ammonia-based multi-zone double-loop process for ultralow emission of multi-pollutant in the present invention is the absorption tower 16. According to the characteristics of the ammonia-based desulfurization, the absorption tower 16 is designed with separated zones. According to the flow direction of the multi-pollutant of the flue gas, the absorption tower 16 is divided into the cooling concentration crystallization zone A, the sulfur oxide absorption zone B, the water washing and purifying zone C, and the dust and mist removing zone D. The cooling concentration crystallization zone, the sulfur oxide absorption zone, and the water washing and purifying zone are interconnected through the gas permeable liquid collecting tray 15 and form a plurality of independent circulation loops by respectively connecting the pumps and tubes with the external additional tanks.

The sulfur oxide absorption zone B is divided into an ammonium sulfite/ammonium hydrogen sulfite absorption section, an ammonium sulfate absorption section, and an absorption liquid mist removing section. The absorption liquid passes through the gas permeable liquid collecting tray 15, the pump, and the tube, respectively. The sulfur oxide absorption zone B and the external tank form two independent circulation absorption loops, i.e., the ammonium sulfite absorption loop and the ammonium sulfate absorption loop, thereby forming a double-loop process of the absorption zone.

The flue gas enters the cooling concentration crystallization zone A of the absorption tower 16 through the gas flue, and contacts the concentrated ammonium sulfate slurry circularly sprayed by the concentration pump 9. The water in the slurry is continuously evaporated, and the evaporated slurry falls down to the concentration crystallization tank 11 at the bottom of the absorption tower, which further increases the concentration of the ammonium sulfate slurry, and thus leads to crystallization. When the solid content of the ammonium sulfate slurry carrying the crystals reaches 5% or more, the ammonium sulfate slurry is transported to the post-treatment system through the ammonium sulfate discharge pump 12. The specific process is as follows. The slurry is discharged into a hydraulic swirler. After a hydraulic separation, the overflow solution returns to the bottom of the absorption tower 16. The slurry in the bottom of the hydraulic swirler has a solid content of 40-55% and falls into a horizontal two-stage piston pusher centrifuge. After being separated by a high-speed centrifugation, the water content of the wet ammonium sulfate material is about 2-5%. After that, the wet ammonium sulfate material is transported to a vibrating fluidized bed dryer through a spiral conveyer, and is dried to obtain the finished product of ammonium sulfate having a water content less than 1%. Lastly, the finished product of ammonium sulfate is packaged for sale by a packaging machine.

After the flue gas exchanges heat with the ammonium sulfate slurry, the temperature of the flue gas is lowered. The flue gas carries a large amount of tiny particles of ammonium salt and mist droplet in the ascending process. The flue gas carrying a large amount of ammonium salt and mist droplets enters the sulfur oxide absorption zone B through the gas permeable liquid collecting tray 15 to reach the sprayer 14 of the ammonium sulfite/ammonium hydrogen sulfite absorption section. The number of layer of the sprayer 14 depends on the sulfur content of the flue gas. After the absorption liquid absorbs the sulfur dioxide, the absorption liquid is collected by the gas permeable liquid collecting tray 15 and then naturally flows down into the ammonia adding tank 3. The absorption liquid is sprayed in a circulating manner through the ammonium sulfite pump 5 connected to the ammonia adding tank 3. After the flue gas passes through the ammonium sulfite/ammonium hydrogen sulfite absorption section, due to the instability of the ammonium sulfite salt, a part of the ammonium sulfite salt is decomposed to generate free ammonia during the efficient absorption of sulfur oxide, so that the mist carrying a part of the free ammonia is formed. The mist ascends to the ammonium sulfate absorption section through the gas permeable liquid collecting tray 15 and then reaches the sprayer 14 of the ammonium sulfate absorption section. After the ammonium sulfate absorption liquid absorbs a part of sulfur dioxide and the free ammonia, the absorption liquid is collected by the gas permeable liquid collecting tray 15 and then naturally flows down into the oxidization tank 8. The absorption liquid is sprayed in a circulating manner through the ammonium sulfate pump 5 connected to the oxidation tank 8. Ammonium sulfite has an unstable characteristic, and is prone to decompose after being heated. Ammonium sulfite is decomposed into sulfur dioxide, ammonia, and water at 60° C., so it must be oxidized before concentration. The oxidation tank 8 is provided with the overflow port 24 that is connected to the cooling concentration crystallization zone.

The oxidation air is blown into the oxidation tank 8 from the bottom through the tubes by the air blower. The tube-mesh oxidation air distributor 6 is provided on the bottom of the oxidation tank. The air is ejected from the distributor to form countless tiny bubbles. In the ascending process, the tiny bubbles subjected to a gradually decreasing pressure of the solution become larger and larger, and then pass through the multilayer bubbling porous plate 7 provided in the oxidation tank 8. The bubbling porous plate 7 plays a role of a secondary bubble cutting, increasing the number of the bubbles, increasing the surface area of the bubbles, prolonging the time that the bubbles contact the solution, improving the oxidation efficiency, and removing the foam.

After the completion of the oxidization, the ammonium sulfate solution in the oxidation tank 8 partially overflows to the concentration crystallization tank 11 at the bottom of the cooling concentration crystallization zone A. The slurry in the concentration crystallization tank 11 exchanges the heat with the flue gas under the continuous circulation action of the pump, so as to separate out the ammonium sulfate crystal. In order to prevent the ammonium sulfate crystal from depositing and agglomerating at the bottom of the tower, the tube-mesh air agitation device 10 is provided in the concentration crystallization tank. The tube-mesh air agitation device 10 intercommunicates with the external compressed air supplying device to stir the slurry and secondarily oxidize the remaining ammonium sulfite in the concentration crystallization tank 11.

The oxidation process ensures that the oxidation ratio of ammonium sulfite is up to 98% or above, the liquid level of the oxidation tank 8 is effectively reduced, the pressure head of the air blower is effectively reduced, and the investment cost and operating cost are reduced.

A plurality of absorption liquid mist eliminators 18 are provided at the top of the sulfur oxide absorption zone B. The porous tubular flusher 17 with the nozzle facing upward is provided at the bottom of the mist eliminator to remove the mist droplet secondarily carried by the flue gas. Preferably, the spraying liquid is the process water.

The flue gas passes through the gas permeable liquid collecting tray 15, and enters the water washing and purifying zone C from the sulfur oxide absorption zone B to reach the water washing layer. The water washing layer is composed of the filler adsorption layer 19 provided on and at the bottom of the water washing sprayer 14. The spraying liquid is water, and the water is used for absorbing ammonium salts and mist droplet carried by the flue gas. The flushing liquid discharged from the water washing layer enters the water washing circulation tank 1, and is sprayed in a circulating manner in the water washing and purifying zone C through the water washing pump 2.

According to actual requirements, multiple sets of water washing layers for spraying in a circulating manner are provided.

The composite mist eliminator is provided in the dust and mist removing zone D. The composite mist eliminator includes multiple levels of mist removing layers. The primary mist eliminator 20 is provided at the lowermost layer, the mesh mist eliminator 21 is provided at the middle layer, and the wire-mesh electric mist eliminator is provided at the upper layer. The wire-mesh electric mist eliminator includes the cathode wire 22 arranged inside the tower, the mesh anode plate 23, and the high-voltage power supply 25 arranged outside the tower. The high voltage power supply 25 includes any one of a utility frequency power supply, a high frequency power supply, a pulse power supply, a plasma power supply, a direct current power supply, and a variable frequency power supply. Various pollutants such as droplets, tiny particles, and aerosols that are carried by the flue gas are removed step by step.

The mesh anode plate 23 is arranged perpendicular to the direction of the gas flow. The cathode system is arranged at the lower portion of the anode plate 23. When the flue gas flows through the electrostatic dust (mist) removing zone of the wire-mesh electric mist eliminator, the direction of the electric field force applied to the dust and the droplet is in the same vertical line as the direction of the air inducing force, so that the dust and the mist droplet particles are collected on the anode plate 23 under the combined action of the air inducing force and the electric field force. The dust and the mist contact and are attached to the mesh anode plate 23. Since the mesh type anode plate 23 is used, the tiny particles impact a lot inside the multilayer mesh, then gradually become large particles, and finally flow into the absorption tower 16 under the action of gravity, so as to avoid the secondary carrying of the droplets attached to the anode plate 23 due to the flow rate of the flue gas. The mist droplet removal ratio is up to 99%, and the mist droplet content in the flue gas outlet 24 is less than or equal to 20 mg/Nm$^3$.

The set of the device is designed scientifically and has a compact arrangement. At present, many sets of devices using the ammonia-based multi-zone double-loop process for ultra-low emission of multi-pollutant have come into service, which have a high desulfurization and dust removal efficiency, and can completely avoid the tailing and falling phenomenon of flue gas. At the flue gas outlet 24, the content of SO$_2$ is less than 35 mg/Nm$^3$, and the content of the particulate matter is less than 5 mg/Nm$^3$. The present invention can achieve the ultra-low emission and the long-term stable operation is highly appreciated by a wide range of users.

The basic principles, main characteristics, and advantages of the present invention are shown and described above. Those skilled in the art should understand that the above-mentioned embodiments are not intended to limit the present invention in any form, and all the technical solutions obtained by equivalent substitution or equivalent transformation should be considered as falling within the protection scope of the present invention.

What is claimed is:

1. An ammonia-based multi-zone double-loop process for ultralow emission of multi-pollutant, comprising:
    successively passing a flue gas through a cooling concentration crystallization zone, a sulfur oxide absorption zone, a water washing and purifying zone, and a dust and mist removing zone to form a clean flue gas after the flue gas enters from an inlet of an absorption tower, and discharging the clean flue gas from an outlet;
    wherein, the cooling concentration crystallization zone, the sulfur oxide absorption zone, the water washing and purifying zone, and the dust and mist removing zone are separated by gas permeable liquid collecting plates; the cooling concentration crystallization zone, the sulfur oxide absorption zone, and the water washing and purifying zone are respectively provided with a plurality of sprayers, and spraying liquids of the cooling concentration crystallization zone, the sulfur oxide absorption zone, and the water washing and purifying zone are a concentration liquid, an absorption liquid, and a water washing liquid, respectively;
    spraying the absorption liquid in a circulating manner through an absorption pump after the absorption liquid converges into an absorption tank;
    spraying the concentration liquid in a circulating manner through a concentration pump after the concentration liquid converges into a concentration crystallization tank at a bottom of the absorption tower; and
    spraying the water washing liquid in a circulating manner through a water washing pump after the water washing liquid converges into a water washing circulation tank;
    wherein the dust and mist removing zone is provided with a composite mist eliminator, the composite mist eliminator comprises a ridged or plate primary mist eliminator in a lower layer, a mesh mist eliminator in a middle layer, and a wire-mesh electric mist eliminator in an upper layer.

2. The ammonia-based multi-zone double-loop process for the ultralow emission of the multi-pollutant according to claim 1, wherein the wire-mesh electric mist eliminator comprises a high-voltage power supply, a cathode wire, and an anode plate; the anode plate comprises a support grid and a multilayer mesh; a distance between the cathode wire and the anode plate is 100-250 mm; and the high-voltage power supply is any one selected from the group consisting of a utility frequency power supply, a high frequency power supply, a pulse power supply, a plasma power supply, a direct current power supply, and a variable frequency power supply.

3. The ammonia-based multi-zone double-loop process for the ultralow emission of the multi-pollutant according to claim 1, wherein an upper portion of the anode plate of the wire-mesh electric mist eliminator is provided with a plurality of porous tubular flushers with nozzles facing downwards; a lower portion of the mesh mist eliminator is provided with a plurality of porous tubular flushers with nozzles facing upwards; and a flushing liquid is process water.

4. The ammonia-based multi-zone double-loop process for the ultralow emission of the multi-pollutant according to claim 1, wherein a top of the sulfur oxide absorption zone is provided with a plurality of absorption liquid mist eliminators; a bottom of the absorption liquid mist eliminator is provided with a porous tubular sprayer with a nozzle facing upwards; and a spraying liquid of the porous tubular sprayer is process water.

5. The ammonia-based multi-zone double-loop process for the ultralow emission of the multi-pollutant according to claim 1, wherein a plurality of porous tubular sprayers are provided in the water washing and purifying zone to form a plurality of water washing layers, and a filler adsorption layer is provided on a bottom of the water washing and purifying zone.

6. The ammonia-based multi-zone double-loop process for the ultralow emission of the multi-pollutant according to claim 1, wherein the absorption liquid comprises an ammonium sulfite solution and an ammonium sulfate solution, and the ammonium sulfite solution and the ammonium sulfate solution are sprayed in an ammonium sulfite or ammonium hydrogen sulfite absorption section and an ammonium sulfate absorption section, respectively;
    wherein after the ammonium sulfate solution converges into an oxidation tank, spraying the ammonium sulfate solution in a circulating manner through an ammonium sulfate pump; and
    after the ammonium sulfite solution converges into an ammonia adding tank, spraying a first part of the ammonium sulfite solution in the circulating manner through an ammonium sulfite pump, and discharging a part other than the first part of the ammonium sulfite solution into the oxidation tank.

7. The ammonia-based multi-zone double-loop process for the ultralow emission of the multi-pollutant according to claim 6, wherein a combinational gas distributor is provided in the oxidation tank, the combinational gas distributor comprises a porous tubular air distributor and a multilayer bubbling porous plate; a distance between the porous tubular air distributor and a bottom of the oxidation tank is 600-1500 mm; the multilayer bubbling porous plate is provided above the porous tubular air distributor; and each hole of the multilayer bubbling porous plate has a diameter of 5-30 mm.

8. The ammonia-based multi-zone double-loop process for the ultralow emission of the multi-pollutant according to claim 6, wherein an oxidation air distributing tube is provided on the bottom of the oxidation tank; an overflow port connected to the cooling concentration crystallization zone is provided on a wall of the oxidation tank; and an air outlet connected to the absorption tower is provided at tops of the oxidation tank and the ammonia adding tank.

9. An ammonia-based multi-zone double-loop process for ultralow emission of multi-pollutant, comprising:

successively passing a flue gas through a cooling concentration crystallization zone, a sulfur oxide absorption zone, a water washing and purifying zone, and a dust and mist removing zone to form a clean flue gas after the flue gas enters from an inlet of an absorption tower, and discharging the clean flue gas from an outlet wherein, the cooling concentration crystallization zone, the sulfur oxide absorption zone, the water washing and purifying zone, and the dust and mist removing zone are separated by gas permeable liquid collecting plates; the cooling concentration crystallization zone, the sulfur oxide absorption zone, and the water washing and purifying zone are respectively provided with a plurality of sprayers, and spraying liquids of the cooling concentration crystallization zone, the sulfur oxide absorption zone, and the water washing and purifying zone are a concentration liquid, an absorption liquid, and a water washing liquid, respectively;

spraying the absorption liquid in a circulating manner through an absorption pump after the absorption liquid converges into an absorption tank;

spraying the concentration liquid in a circulating manner through a concentration pump after the concentration liquid converges into a concentration crystallization tank at a bottom of the absorption tower; and spraying the water washing liquid in a circulating manner through a water washing pump after the water washing liquid converges into a water washing circulation tank;

wherein the cooling concentration crystallization tank is provided with a tube-mesh air agitation device with a plurality of nozzles, and the tube-mesh air agitation device is connected to an ammonium sulfate post-treatment system.

* * * * *